July 26, 1960
R. S. DOBBS
2,946,338
VALVE OPERATING MECHANISM
Filed April 25, 1955
14 Sheets-Sheet 1
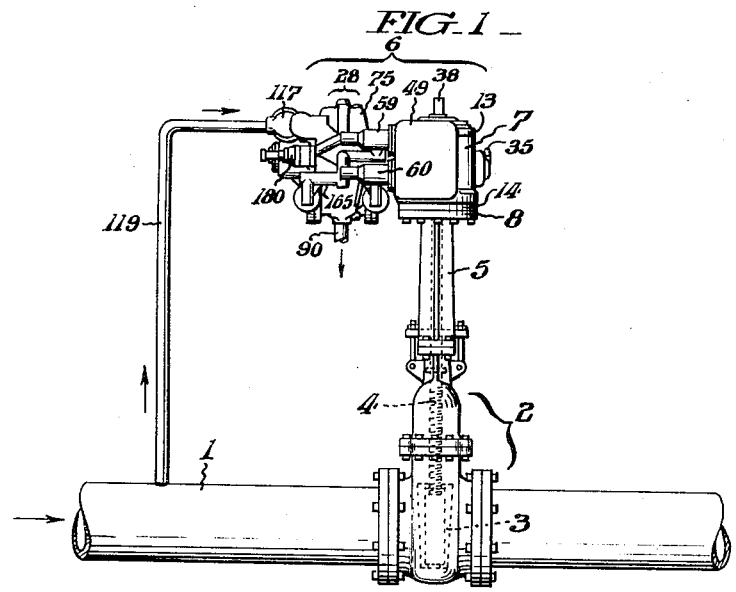
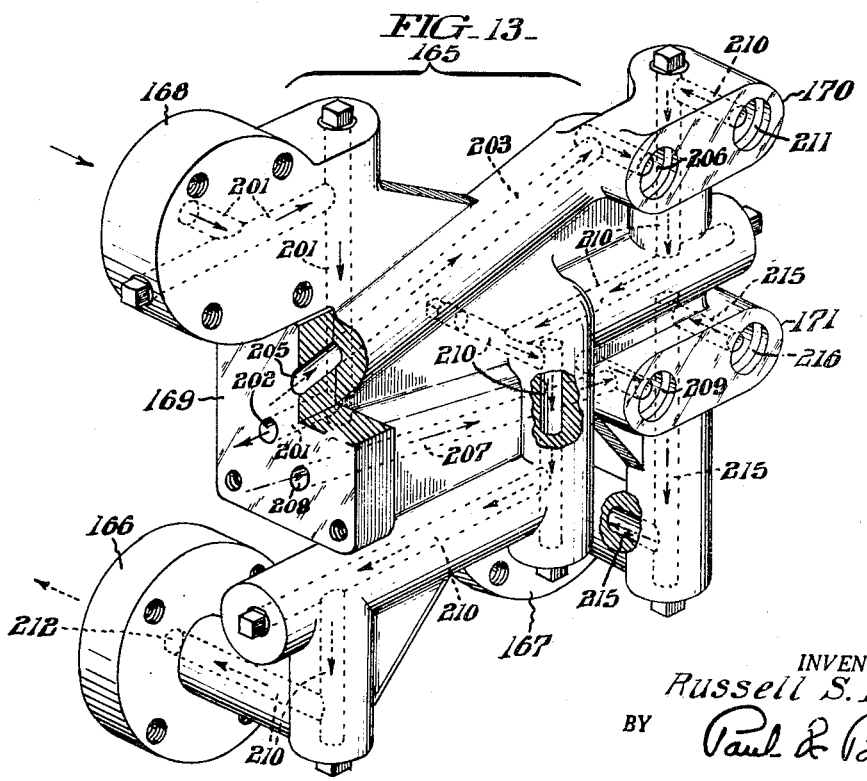
INVENTOR.
Russell S. Dobbs,
BY Paul & Paul
ATTORNEYS.

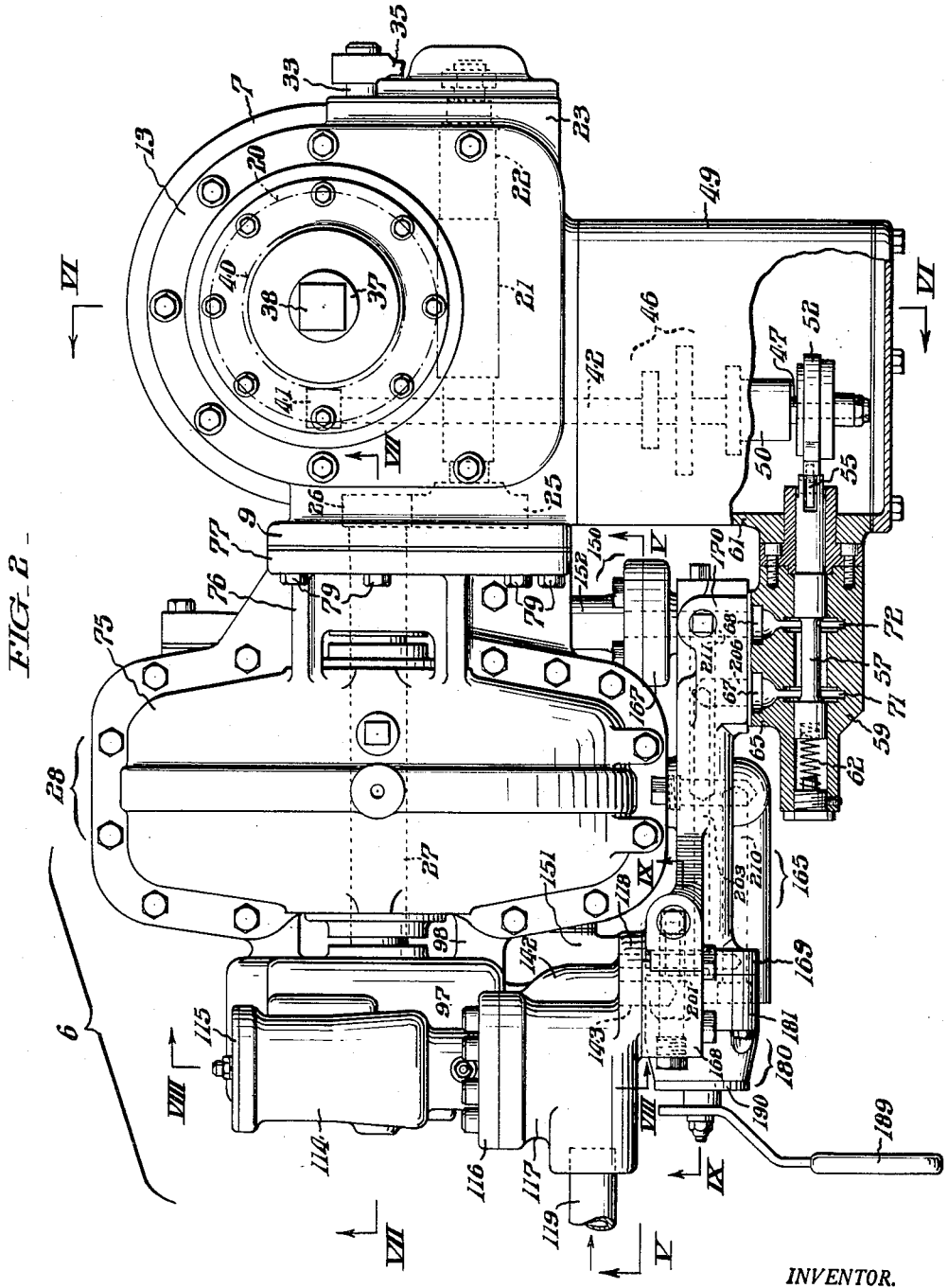

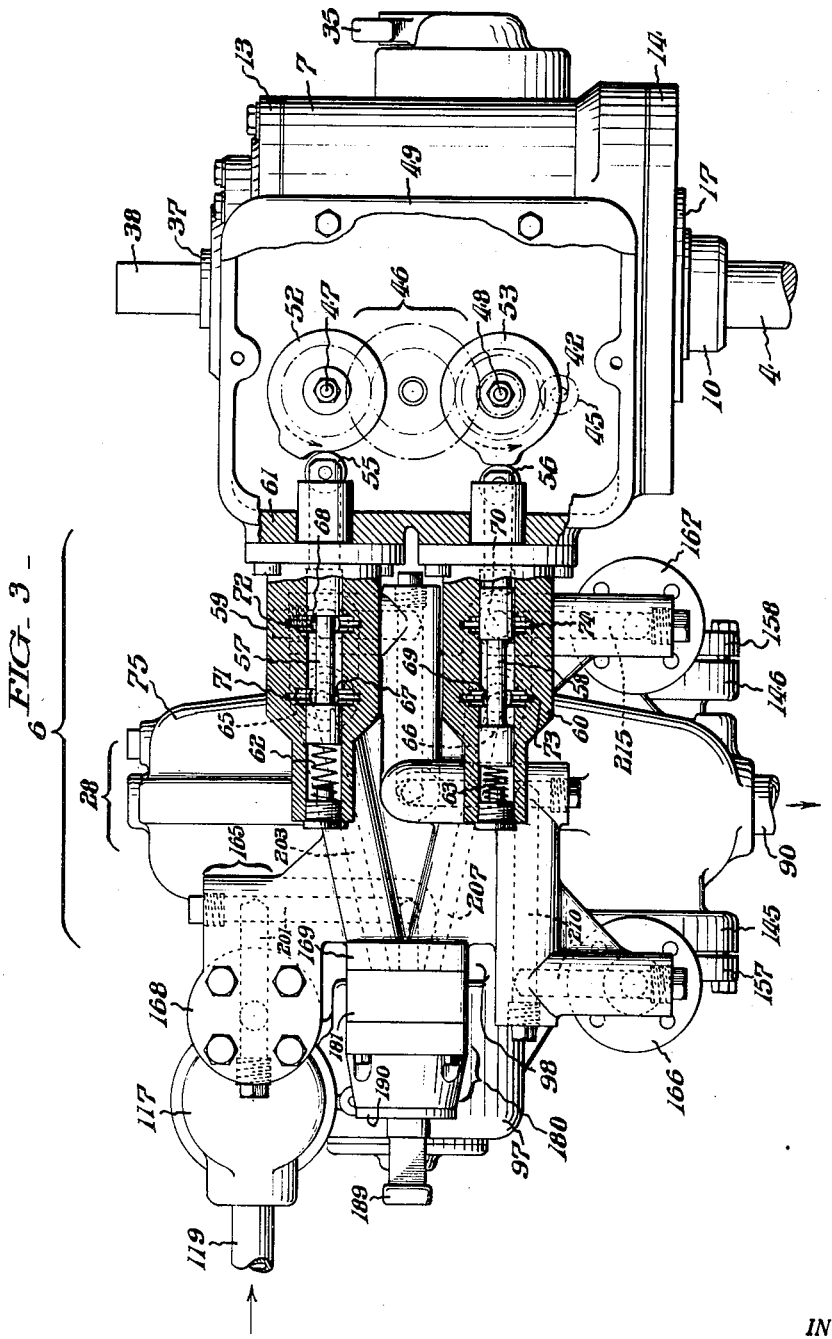

July 26, 1960
R. S. DOBBS
2,946,338
VALVE OPERATING MECHANISM
Filed April 25, 1955
14 Sheets-Sheet 4
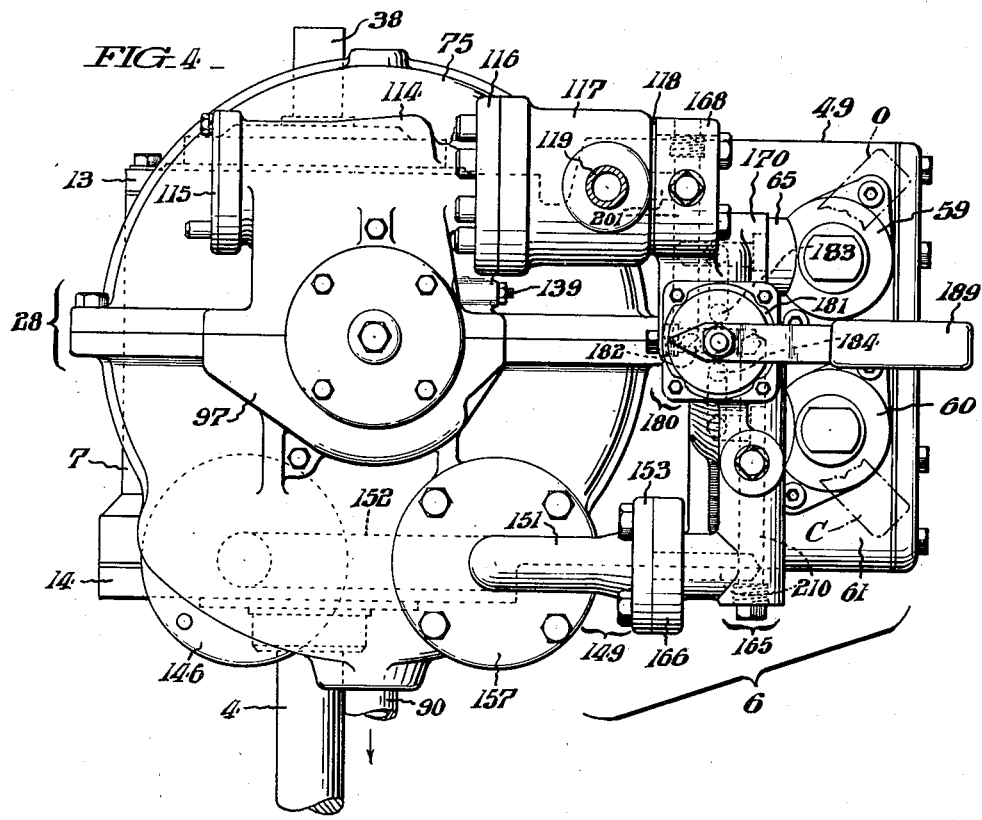
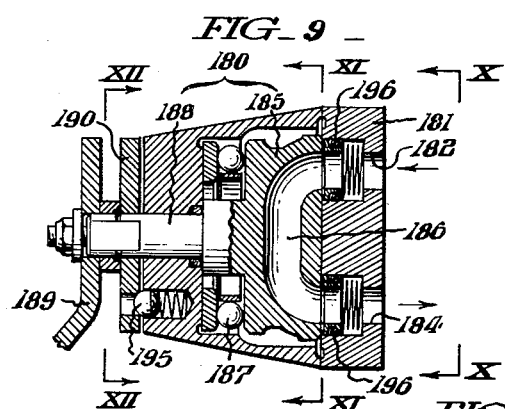
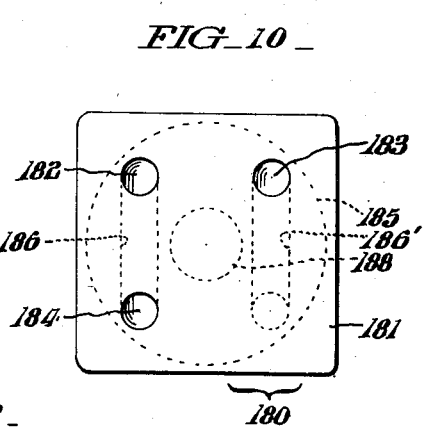
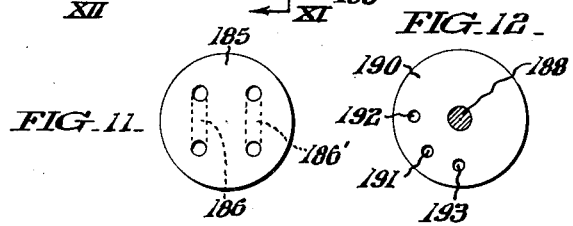
INVENTOR.
Russell S. Dobbs,
BY Paul & Paul
ATTORNEYS.

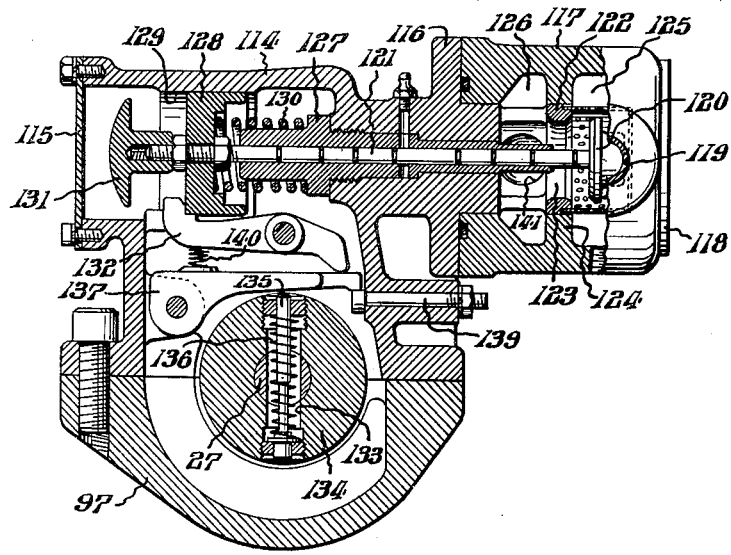

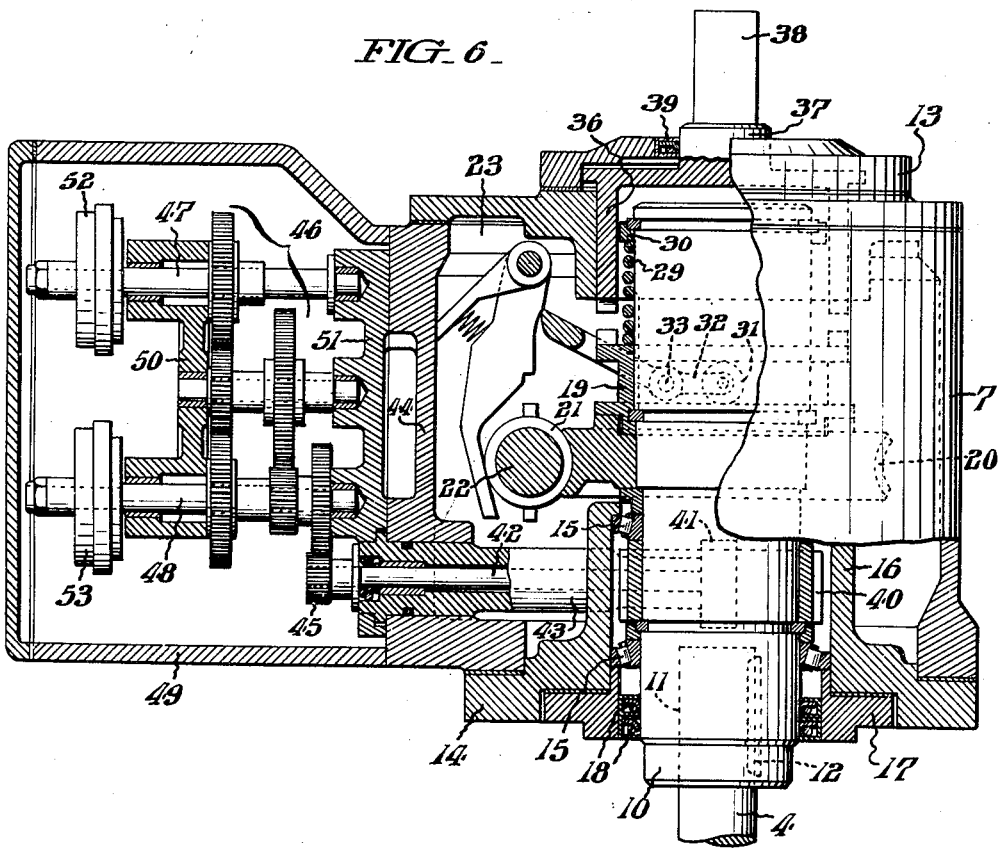

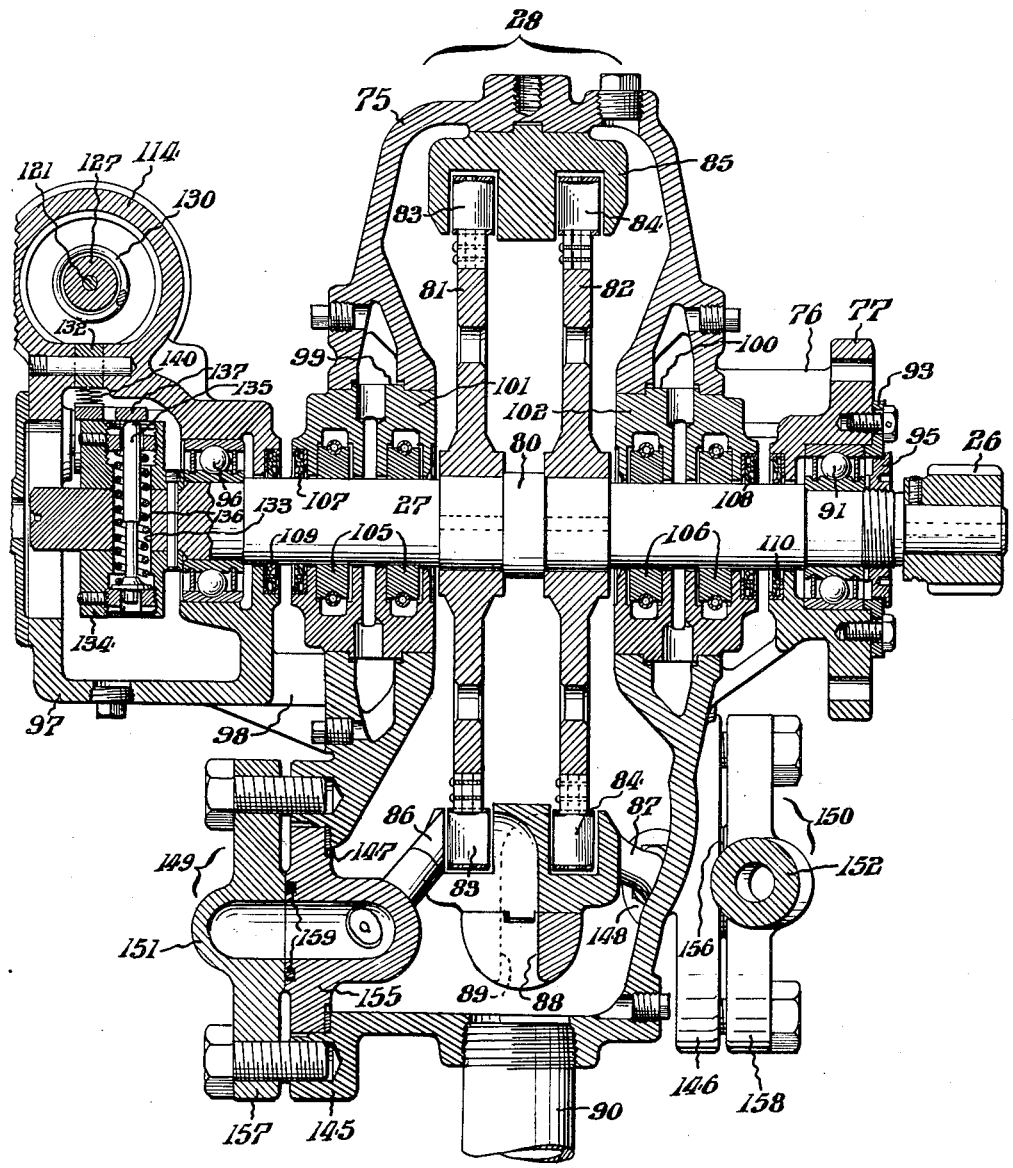

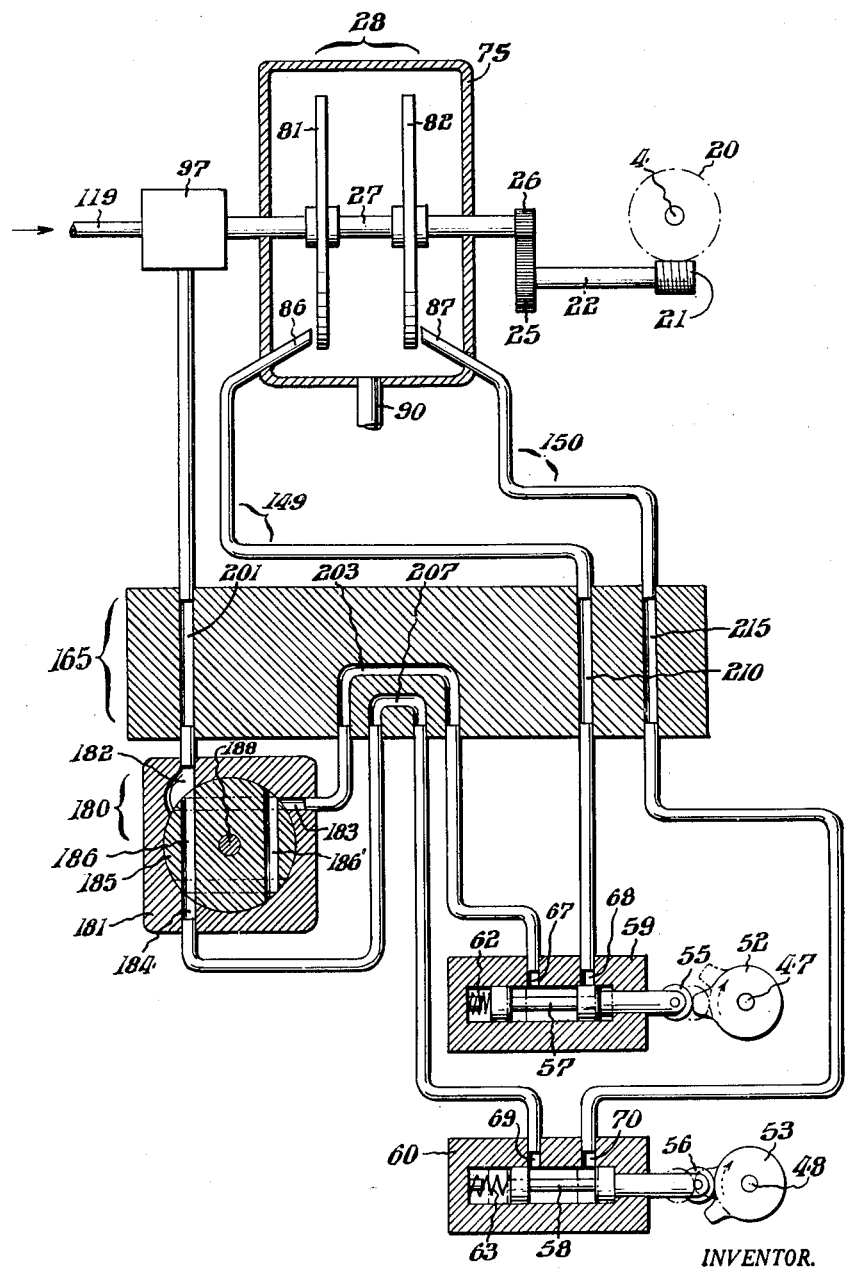

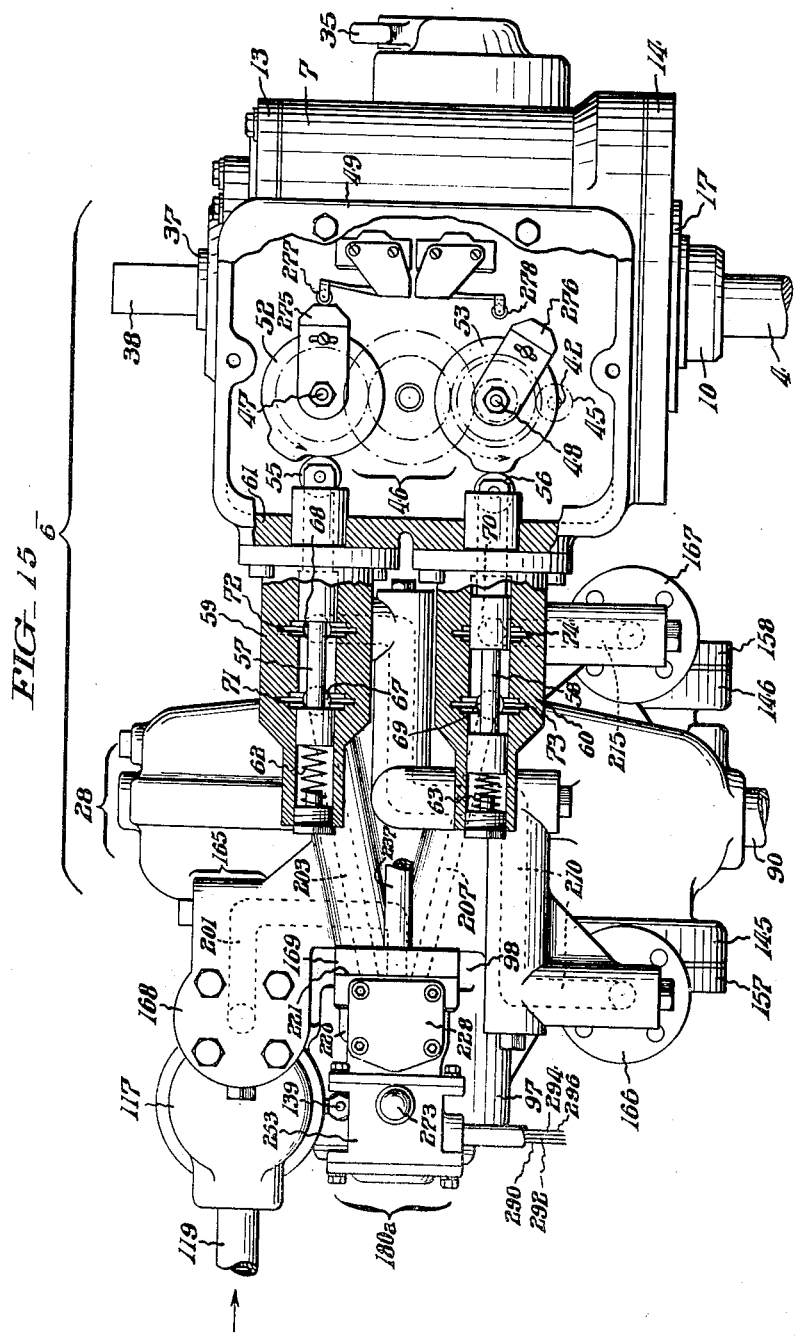

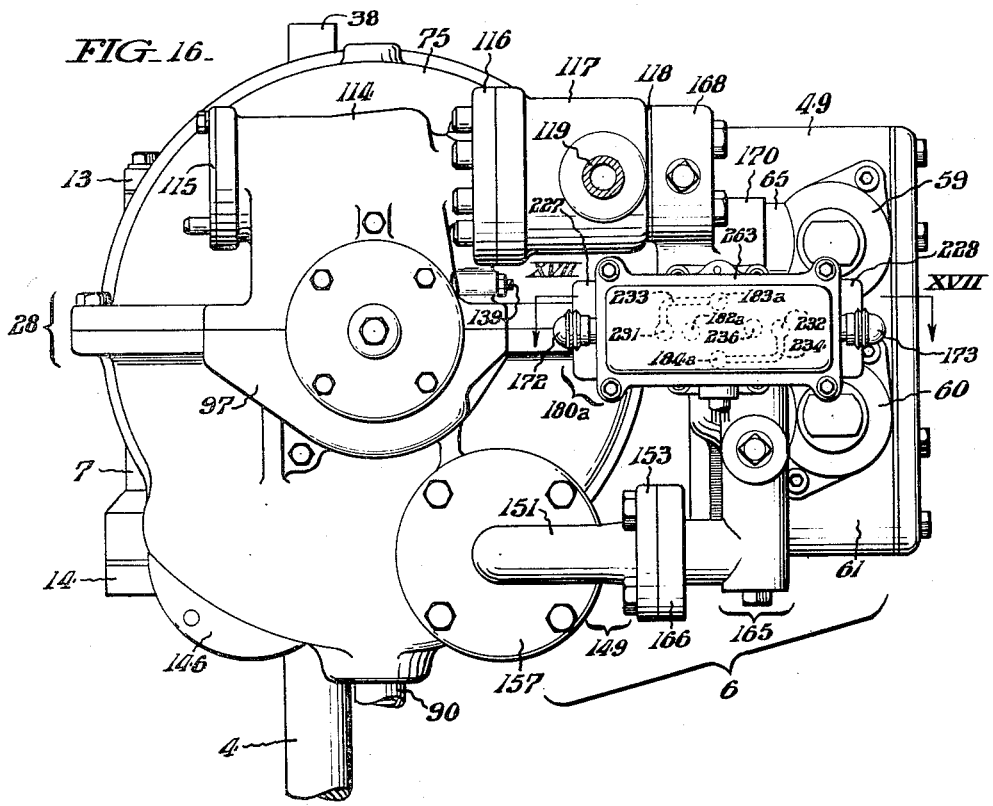

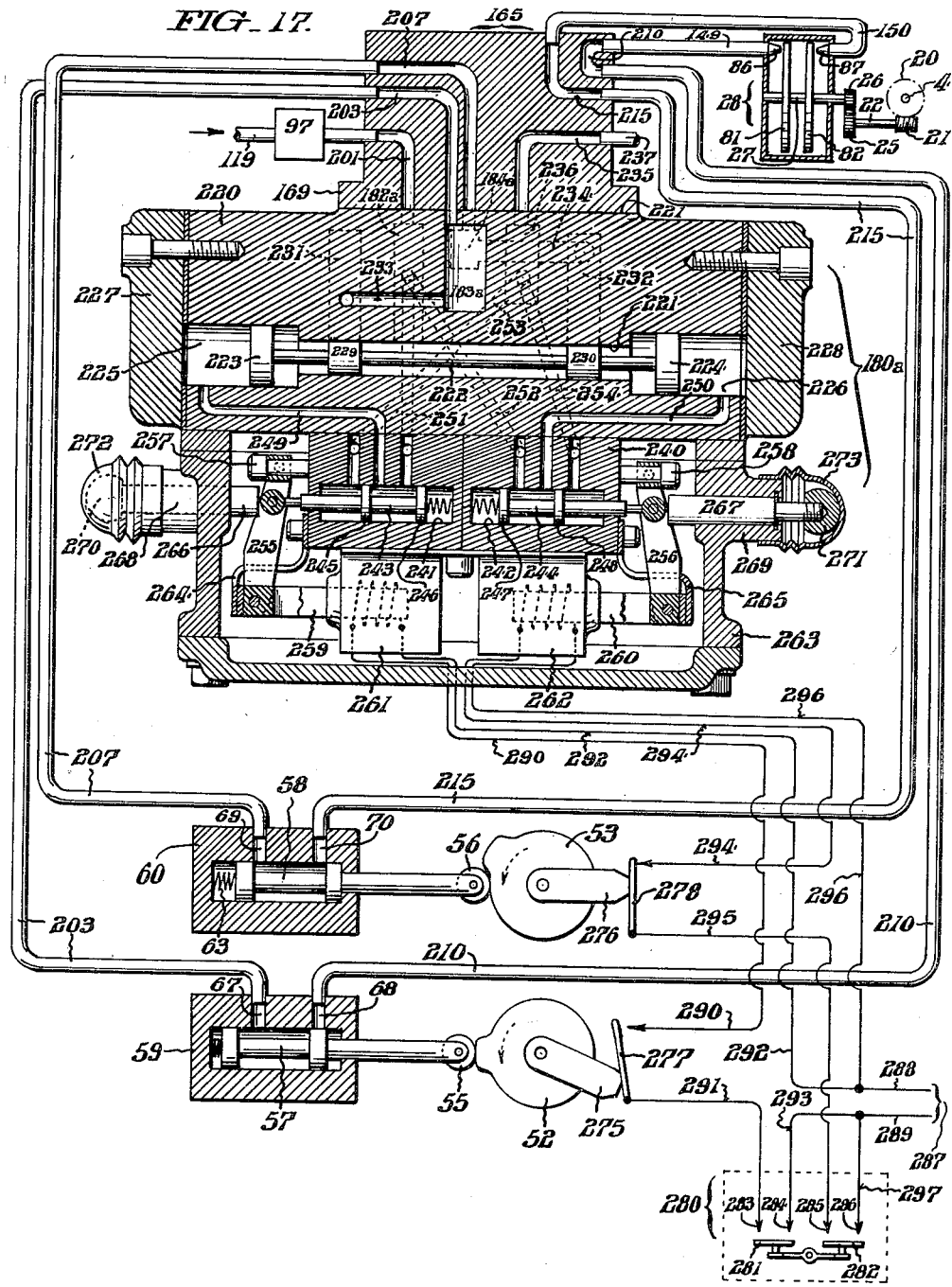

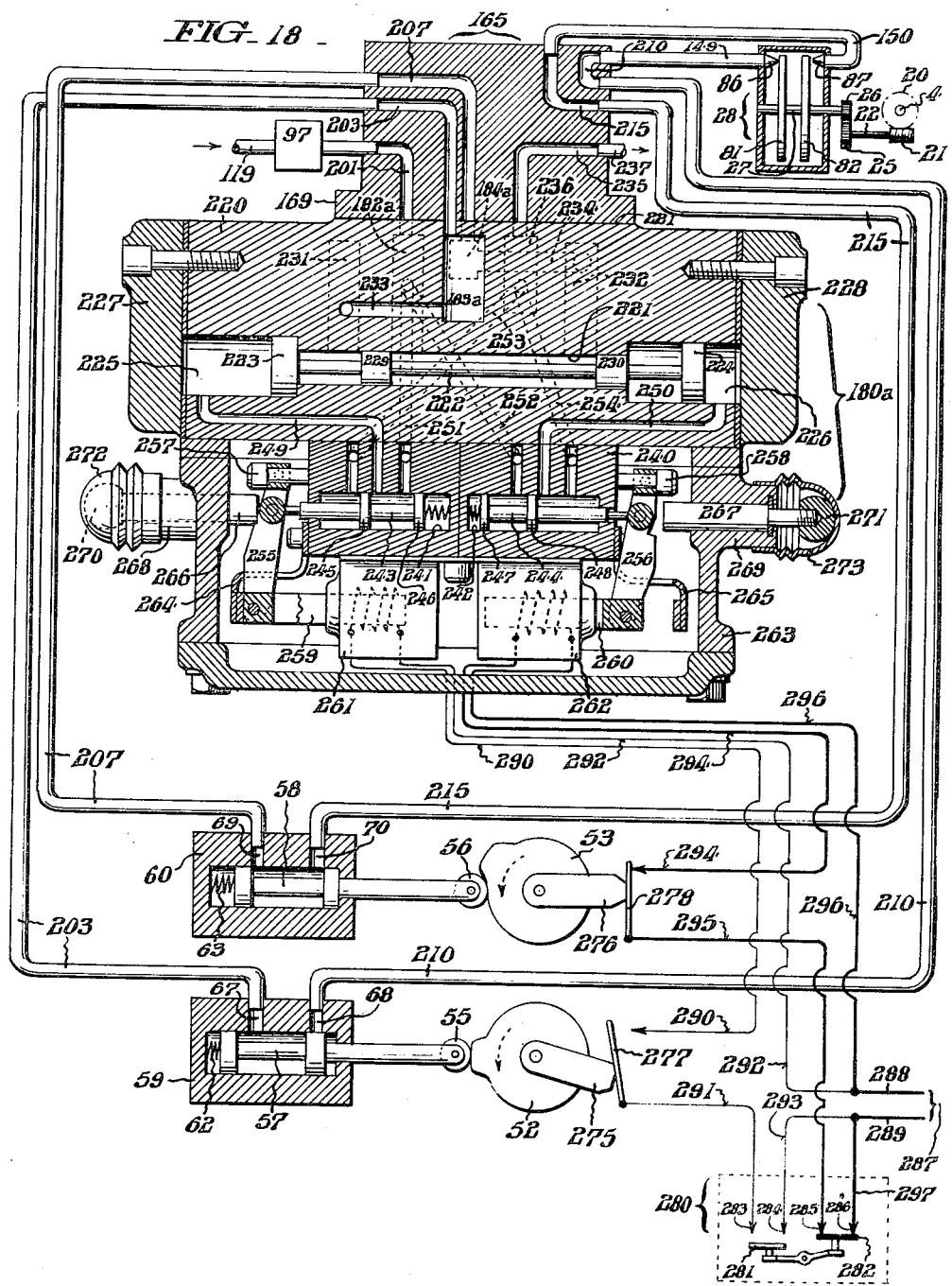

July 26, 1960

R. S. DOBBS 2,946,338

VALVE OPERATING MECHANISM

Filed April 25, 1955

INVENTOR.
Russell S. Dobbs,
BY Paul & Paul
ATTORNEYS

July 26, 1960

R. S. DOBBS 2,946,338

VALVE OPERATING MECHANISM

Filed April 25, 1955

INVENTOR.
Russell S. Dobbs,
BY Paul & Paul
ATTORNEYS

United States Patent Office 2,946,338
Patented July 26, 1960

2,946,338

VALVE OPERATING MECHANISM

Russell S. Dobbs, Haddonfield, N.J., assignor to Philadelphia Gear Works, Inc., Philadelphia, Pa., a corporation of Pennsylvania Filed Apr. 25, 1955, Ser. No. 503,450

8 Claims. (Cl. 137—22)

This invention relates to valve operating mechanisms. More particularly, it is concerned with powered mechanism of operating gate or plug valves interposed in over ground conduit or trunk lines through which fluids such as heating or illuminating gas is conducted under pressure over great distances from mines or wells for use in town and cities.

The chief aim of my invention is to provide a mechanism for the above purpose in the form of a compact unitary structure which is relatively simple and immune against easy derangement; which can be relied upon to fully open or close the trunk line valve quickly without inducing any harmful strains in the valve parts; and of which all the moving elements are enclosed within a multipartite housing against lubricant leakage therefrom as well as against being affected by inclement weather conditions.

In connection with valve operating mechanism having the above attributes, it is a further aim of my invention to provide means whereby opening and closing of the trunk line valve can be controlled from a remote point or points.

A further aim of my invention is to provide in association with such mechanism, a reversible drive means capable of propulsion either by pressurized fluid or gas taken from the trunk line itself, or from a separate source of such fluid or gas.

How the foregoing and other objects and advantages are realized in practice will appear from the following detailed description of the attached drawings, wherein:

Fig. 1 is a view in elevation of a valve with associated operating mechanism conveniently embodying my invention.

Fig. 2 shows the mechanism in top plan or a larger scale with a portion broken out and in section.

Fig. 3 shows the front elevation of the valve operating mechanism as seen looking toward the bottom of Fig. 2, likewise with a portion broken out and in section.

Fig. 4 is an elevation of the valve operating mechanism as it is seen from the left of Fig. 2.

Fig. 5 is a front elevation of the mechanism with portions forward of the plane V—V in Fig. 2 removed.

Fig. 6 is a detail sectional view taken as indicated by the angled arrows VI—VI in Fig. 2 and drawn to a still larger scale.

Fig. 7 is an axial sectional view of the turbine taken as indicated by the angled arrows VII—VII in Fig. 2.

Fig. 8 is a detail sectional view taken as indicated by the angled arrows VIII—VIII in Fig. 2.

Fig. 9 is a detail sectional view taken as indicated by the angled arrows IX—IX in Fig. 2.

Fig. 10 is a view looking as indicated by the angled arrows X—X in Fig. 9.

Figs. 11 and 12 are sectional views drawn to a smaller scale, taken as indicated respectively by the angled arrows XI—XI and XII—XII in Fig. 9.

Fig. 13 is a perspective view of one of the frame components of the valve operating mechanism.

Fig. 14 is a diagrammatic view of the mechanism with various components thereof shown in section.

Figures 15 and 16 are views similar to Figs. 3 and 4 showing the mechanism with remote control means for governing the operation of the turbine.

Fig. 17 is a view in section taken as indicated by the angled arrows XVII—XVII in Fig. 16 and drawn to a larger scale with certain parts of the mechanism and the electrical connections of the remote control means diagrammatically shown; and Figs. 18–20 are views similar to Fig. 17 showing how the mechanism functions under remote control to open the line trunk valve.

Figure 19:
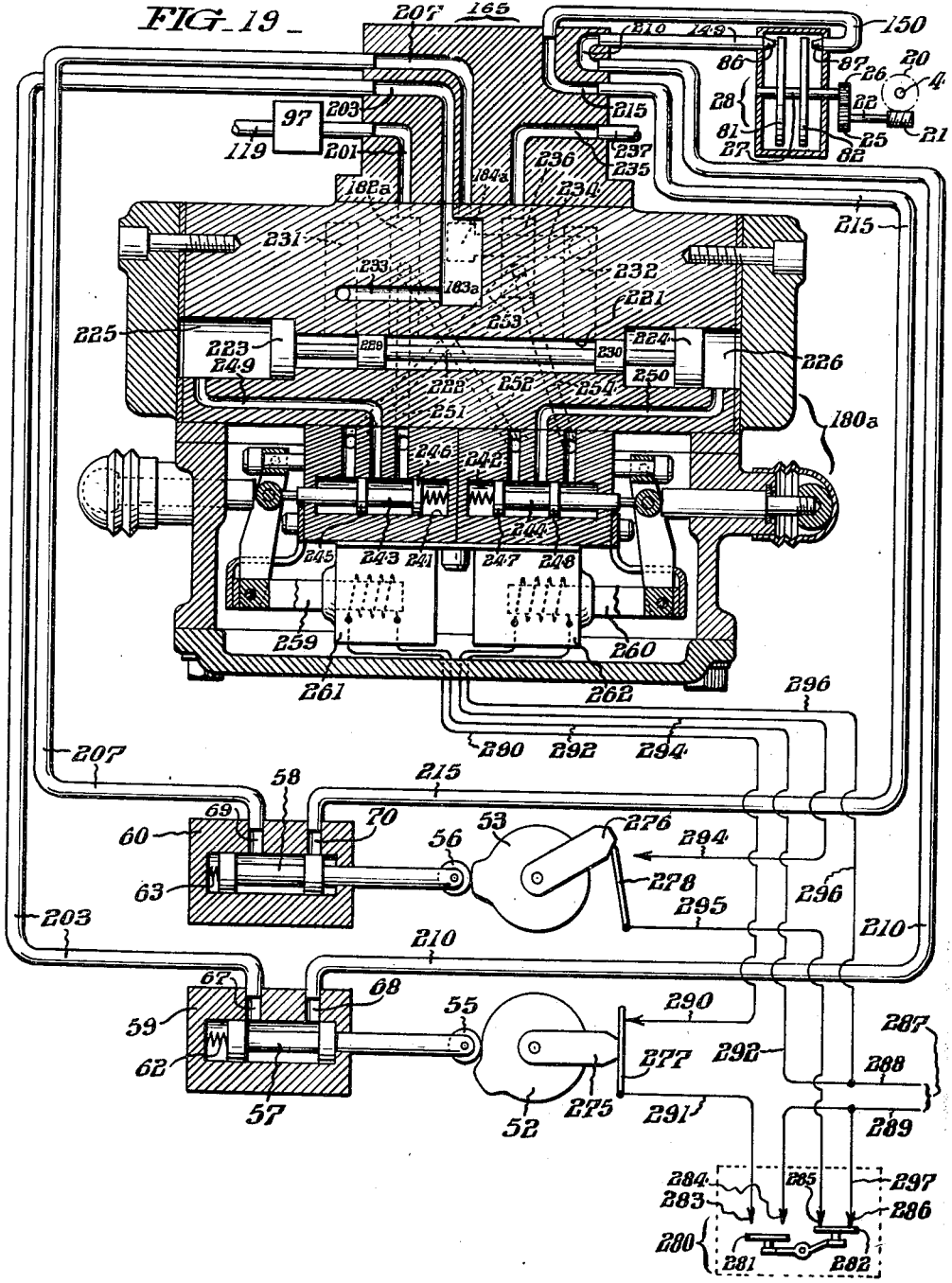

In Fig. 1, the numeral 1 designates a large conduit or line trunk through which natural gas (for example) is conveyed under pressure say between 400 to 1000 pounds from a mine or a gas well to some distant point. Interposed in the conduit or line trunk is a valve 2 which is represented as being of the well known gate type whereof the closure element 3 is threadedly engaged with the lower end of the actuating stem 4 rotatively borne in an upstanding riser bracket 5 bolted to the top of valve body.

The operating mechanism with which may invention is more especially concerned, is comprehensively designated 6. The housing of the mechanism 6 is composed of several cast sections, including a section 7 which is bolted fast to a flange 8 at the top of the riser bracket 5 of the valve 2. Extending vertically through the housing section 7 (Fig. 6) is a transmission shaft 10 which is socketed axially at its lower protruding end, as at 11, to engage over the upper end of the valve stem 4 whereto it is splined as at 12 in Fig. 6. The housing section 7 is closed top and bottom by covers 13 and 14 respectively and the shaft 10 is rotatively supported by thrust roller bearings 15 lodged in the hollow of an upward boss 16 of the bottom cover 14 and held in place therein by a retaining annulus 17. Lodged within the annulus 17 are packing rings 18 which form a fluid seal around the lower protruding end of the shaft 10. Free on the transmission shaft 10 above the boss 16 of the bottom cover 14 but normally clutched to said shaft by a toothed clutch collar 19 is a worm wheel 20 with which meshes a worm 21 on a transverse shaft 22 journalled in a lateral offset 23 of the casing section 7. A spur gear wheel 25 (Fig. 2) at one end of the shaft 22 meshes, in turn, with a spur pinion 26 on the shaft 27 of a turbine generally designated 28. The clutch collar 19 is urged toward the worm wheel 20 by a helical spring 29 which, at the top, abuts a stop ring 30 at the upper end of the shaft 10, and a circumferential groove in said collar is engaged by rollers 31 at the extremities of a yoke arm 32 affixed to a rock shaft 33, said rock shaft extending through the side of the casing section 7 and being provided at its protruding end with a crank handle 35 (Fig. 2). Through the means just described, the clutch collar 19 can be raised out of engagement with the worm wheel 20 and engaged with an inverted cup-like member 36 which is rotatively supported in a bore at the top of the housing section 7 and held in place by the cover 13. As shown, the member 36 has a diametrically reduced axial upward projection 37 which terminates in a square end 38 for application of a wrench or other suitable tool whereby the valve 2 can be manually opened or closed in the event of failure of the turbine or loss of power source. A packing ring 39 is set into the top cover 13 of the housing 7 to form a seal around the protruding extension 37 of the member 36.

Affixed to the transmission shaft 10 within the hollow of the boss 16 of the bottom cover 14 is a spiral gear wheel 40 wherewith meshes a spiral pinion 41 on one end of a shaft 42 (Fig. 6) journalled in a bearing sleeve 43. The shaft 42 extends through the side cover 44 of the housing section 7 and, to its protruding end, is affixed spur pinion 45 which, through a train of spur wheels 46, imparts rotary motion at reduced speed to a pair of parallel shafts 47 and 48 within a housing section 49 separately secured to the section 7. As shown, the shafts 47 and 48 are journalled in fixed bearing brackets 50 and 51 within the housing section 49, and affixed to their distal ends are cam disks 52 and 53 respectively. As best seen in Fig. 3, the disks 52 and 53 have circumferential rises to act upon rollers 55 and 56 at the inner ends of plungers 57 and 58 of piston type check valves 59 and 60 of which the housings are separately secured to the side wall 61 of of the casing section 49, the springs designated 62 and 63 serving to yieldingly maintain the rollers of said plungers in operative engagement with said cam disks. At the back (see in Figs. 2 and 3) the housings of the valves 59 and 60 respectively have bosses 65 and 66 with laterally spaced ports 67, 68, and 69, 70 which are in communication with annular grooves 71, 72 and 73, 74 within said housings. The purpose of the means just described is to interrupt flow of the pressurized gas to the turbine 28 upon complete opening and closing of the line trunk valve 2 in a manner more fully explained hereinafter.

The casing 75 of the turbine 28 (Fig. 7) is of multipartite construction and is formed at one side with a bracket projection 76 having a terminal flange 77 to mate with the flange 9 at the open side of the housing section 7 whereto it is secured by bolts 79. Keyed to the turbine shaft 27 at opposite sides of a spacing enlargement 80 are two rotor wheels 81 and 82 having oppositely pitched circumferential vanes 83 and 84 respectively. The peripheries of the rotor wheels 81 and 82 are surrounded by an internally channeled guard annulus 85 suitably fixed within the turbine casing. As later more fully explained, pressurized gas is directed against the vanes 83 and 84 of the rotor wheels 81 and 82 by nozzles 86 and 87 which are correspondingly oppositely directed, the spent gas being directed downwardly by way of hollows 88 and 89 in the annulus 85 and exhausted through a pipe 90 connected into the bottom of the turbine casing. At one end, the turbine shaft 27 is rotatively supported in a ball bearing 91 set into the bracket extension 76 of the casing, the outer race of the bearing being held in place by a keeper annulus 93, and the inner race by a nut ring 95 screw engaged upon the shaft. The outer or distal end of the turbine shaft 27 is rotatively supported in a similar ball bearing 96 set into one side of a box-like formation 97 on a bracket extension 98 at the opposite or outer side wall of the turbine casing, said walls being formed with hollows 99 and 100 for bushings 101 and 102. Gas leakage around the turbine shaft 27 is precluded by carbon rings 105 and 106 which snugly fit about the shaft and which are disposed in internal grooves of the bushings 101 and 102. The turbine shaft 27 is further sealed against leakage thereabout by packing rings 107, 108 and 109, 110.

At the top of the box-like portion 97 on the turbine casing 75 (Figs. 2, 7 and 8) is a formation 114 which, at one end, is closed by a removable cap 115 and which, at the other end has a flange 116. Bolted to the flange 116 is a hollow housing 117 which, at the distal end, has a circular flange 118, and connecting into the side of this section is a pipe 119 which leads from a supply of pressure fluid for operating the turbine 28, in this instance, pressurized gas, from the conduit or line trunk 1 (Fig. 1). Encased within the formation 114 and the attached housing 117 is a safety valve for automatically shutting off the supply of the pressurized gas in the event of overspeeding of the turbine 28. As shown in Fig. 8 this safety valve comprises a closure element 120 which is connected to one end of a slide rod 121 and is adapted to cooperate with a seat 122 surrounding a port 123 in a crosswise partition 124 between a gas inlet chamber 125 and a gas outlet chamber 126 within the housing 117. The slide rod 121 extends through a guide bushing 127 in the portion 114 of the housing 97, and affixed to it beyond the bushing is a piston like head 128 which is slidably guided in the bore 129 of said portion. A helical spring 130 in compression between the head 128 and the confronting end of the bushing 127 tends to urge the closure element 120 towards the seat 122. Affixed to the end of the rod 121 beyond the head 128 is a hand knob 131 which is accessible upon removal of the cap 115 to enable manual re-setting of the closure element 120 to open position in which it is normally held by a medially pivoted latch 132. Spring-restrained within a transverse bore 133 in a fixed collar 134 on the turbine shaft 27 is a plunger 135 which, under the influence of centrifugal force when the turbine 28 exceeds a predetermined speed of rotation, is projected against the restraining effect of the spring 136 to raise a pivoted lever 137. As shown, the lever 137 is arranged to act upon the finger end of the latch 132 so as to rock the latter about its pivot for release of the head 128, whereupon the rod 121 is moved to the left by the spring 130 and the closure element 120 is forced against the seat 122 to shut off the supply of the pressurized gas to the turbine. Normally the lever 137 is stopped against the head of a screw 139 threaded into one side of the housing 97. The spring indicated at 140 is relied upon to cause re-engagement of the latch 132 with the head 128 when the rod 121 is re-set as aforedescribed for re-opening of the port 123. Leading from the chamber 126 through a port 141 in a flange 142 on the housing 117 is an outlet port 143 for the pressurized gas.

Referring again to Fig. 7, it will be noted that to flanges 145 and 146 around openings 147 and 148 at opposite sides of the turbine casing 75 at the bottom are bolted castings 149 and 150 with forwardly extending tubular extensions 151 and 152 having terminal flanges 153 and 154 of which the faces lie in a common vertical plane. Recessed into the openings 147 and 148 are heads 155 and 156 with hollow central protuberances from which the nozzles 86 and 87 extend inwardly at opposite but complemental angles toward the turbine rotors 81 and 82. As shown, the heads 155 and 156 are held in place between recessed annular shoulders around the openings 147 and 148 of the flanges 157 and 158 on the castings 149 and 150 each with interposition of a sealing gasket such as indicated at 159 in Fig. 7.

The manifold section generally designated 165 and separately shown in perspective in Fig. 13 is in the form of a casting and has three circular flanges 166, 167 and 168 in triangular relation, a square flange 169 transversely arranged between the flanges 166 and 168 and two vertically-spaced horizontally-elongate bosses 170 and 171. The circular flanges 168, 166 and 167 are relatively spaced to match respectively with the flange 118 of the housing 117, the terminal flanges 153 and 154 of the gas inlet extensions 149 and 150 of the turbine casing, and the bosses 170 and 171 with the bosses 65 and 66 at the back of the housing 59 and 60 for the slide rods 57 and 58 whereto they are respectively secured as shown in Figs. 1, 2, 3 and 4.

Bolted to the square flange 169 of the casting 165 is a manually operable selector valve 180 (Figs. 1–4 and 9–12) for controlling the operation of the turbine 28. The body 181 of the valve 180, see Figs. 4, 9 and 10 has three ports 182, 183 and 184 arranged respectively in right angle relation, the ports 183 and 184 being equispaced from the port 182. The closure element 185 of the valve 180 is circular in configuration and has parallel arched hollows 186 and 186′ whereof the ends are spaced to correspond with the spacing of the ports 182, 183 and 184. The closure element 185 is backed by a ball bearing 187, and its stem 188 extends through the outer end of the valve body for connection thereto of an actuating handle 189. Affixed to the stem 188 behind the handle 189 is a disk 190 which is provided with three circumferentially spaced holes 191, 192 and 193 which, in cooperation with a spring-pressed ball 195 constrained within a socket in the outer end of the valve body 181, serves to yieldingly maintain the handle 189 either in the normal neutral position in which it is shown in Fig. 4, or in either of the two positions indicated in broken lines "O" and "C" to determine rotation of the turbine in one direction or the other as also explained more fully hereinafter. The spring-biased packing rings shown at 196 in Fig. 9 prevent gas leakage around the closure element 185 of the selector valve 180.

As shown in Figs. 2, 3, 4 and 13, the port 143 leads from the interior of the casing section 117 through the flange 118 of the latter and communicates with a channel 201 in the body of the manifold, said channel terminating at 202 in the flange 169 and registering with the port 182 of the selector valve 180. Another channel 203 in the manifold 165 open at 205 in the flange 169 registers with the port 183 of the valve 180 and terminates in a bore 206 in the boss 170, said bore registering with the port 67 in the body of the valve 59 (Fig. 3). Another channel 207 in the manifold 165 has an open end 208 in the flange 169 to register with the port 184 of valve 180 and extends to a bore 209 in the boss 171 to register with the port 69 in the housing 60. Another channel 210 in the manifold 165 leading from the second bore 211 in the lug 170 and registering with the port 68 in the housing 59, terminates in an open end 212 which communicates, by way of the tubular extension 151 of the turbine housing, to the nozzle 86. Still another channel 215 in the manifold 165 leading from a second bore 216 in the lug 171 in registry with the port 70 of the valve body 60 terminates in an open end in the flange 169 and communicates, by way of the tubular extension 152 of the turbine casing 75, with the nozzle 87.

It is to be understood, of course, that, in practice all of the moving parts of the mechanism are packed with a suitable lubricant, and it will be seen from the foregoing that they are all fully protected against deterioration by external weather conditions by virtue of being sealed within a unitary multipartite housing.

Operation

For explanation of the operation of the mechanism, reference will be had to Figs. 4, 9 and 10 and to the diagram of Fig. 14. To open the trunk line valve 2, the handle 189 of the selector valve 180 is turned from its normal horizontal neutral position in Fig. 4 to the position "O." The closure element 185 of the selector valve 180 is thereby brought to the position in which it is shown in full lines in Fig. 14 with the result that, through the bridging passage 186 therein, communication is established between the gas inlet pipe 119 and the channel 201 in the manifold 165 and the channel 207 in said manifold leading to the port 69 of the check valve 60 of which the slide 58 is in its normal position at this time to permit flow of the gas, by way of the channel 215 in the manifold and the channel 150 to the nozzle 87 of the turbine 28. By impingement of the gas discharged from the nozzle 87 upon the rotor 82, the shaft 27 of the turbine is driven in one direction and, through the gearing 26, 25, 21 and 20, the shaft 10 and the connected stem 4 of the trunk line valve 2 are turned to effect opening of said trunk line valve. Eventually, by concurrent rotation of the shaft 48 through the gearing 40, 41 and 46 (Fig. 2), the high spot of the cam 53 will act upon the slide 58 of the check valve 60 to move it to the position in which it is shown in broken lines in Fig. 14 so as to interrupt the flow of the gas to the nozzle 87 of the turbine when the closure element 3 of the trunk line valve 2 has reached full open position. Also in the meantime, the cam 52 is turned to the broken line position in Fig. 14 and the slide 57 of the check valve 59 shifted to the position in which it is likewise shown in broken lines. When the trunk line valve 2 is to be closed, the handle 189 is turned to the position "C" in Fig. 4 and the selector valve 180 thereby moved to the position in which it is shown in broken lines in Fig. 14, the cams 52 and 53 and the check valves 59 and 60 being then in the broken line positions. Accordingly, the pressurized gas will flow now from the pipe 119 by way of the channel 201 in the manifold 165, through the ports 182 and 183 of the valve 180, channel 203, ports 67 and 68 of check valve 59, and channels 210 and 149 to the nozzle 86 of the turbine to drive the latter this time in the opposite direction. Eventually, the flow of the gas to the turbine will be interrupted when the trunk line valve 2 has been moved to full closed position through shifting of the check valve 59 to the original full line position in Fig. 14, by rotation of the cam 52 in the meantime through its gear connections with the transmission shaft 10. In the event of overspeeding of the turbine 28, the supply of gas thereto will be immediately shut off upon automatic functioning of the safety valve 97 in the manner hereinbefore explained. The exhaust gas from the turbine 28 may be discharged directly through the pipe 90 into the atmosphere; or the pipe may be connected to a suitable receiver, not illustrated. Moreover if desired, pressure fluid for driving the turbine may be supplied from a separate source rather than from the line trunk 1.

Modified embodiment

In the modified embodiment of my invention illustrated in Figs. 15–20, an electrically operable selector valve 180a has been substituted for the manual selector valve 180 of the first described embodiment, and means have been provided whereby the functioning of the substitute valve can be controlled from a point remote from the mechanism for opening and closing the trunk line valve 2. Except as hereinafter pointed out, the mechanism 6 of the modified embodiment is identical with that of the first embodiment, and therefore the various components thereof have been identified by the same reference numerals previously employed. In Figs. 17–29, the manifold is represented at 165 and its square flange indicated at 169. As shown, the body section 220 of the valve 180a has a machined face 221 abutting the flange 169 of the manifold 165, and ports 182a, 183a and 184a in registry respectively with the corresponding ends of the channels 201, 203 and 207 in said manifold. Operative in a bore 221 in the body section 220 of the valve 180a is a slide 222 having piston heads 223 and 224 disposed in the enlarged ends 225 and 226 of said bore, which ends are closed by screw-secured cover plates 227 and 228. Smaller heads 229 and 230, spaced in the interval between the piston heads 223 and 224 on the slide 222, normally cover ports 231 and 232 in the body section 220 of the valve 180a as shown in Fig. 17. By way of channels 233 and 234, the ports 231 and 232 are in communication respectively with the ports 183a and 184a. The manifold 165 is formed in this instance with an additional channel 235 which is in communication with a fourth port 236 in the body section 220 of the valve 180a, and from which leads a pipe 237. The smaller body section 240 of the valve 180a is suitably secured to the section 220 and has two axially aligned bores 241 and 242 containing spring biased slides 243 and 244 respectively having spaced heads 245, 246 and 247, 248. By way of channels 249 and 250 the bores 241 and 242 of the body section 240 are in communication with the ends 225 and 226 of the bore in the body section 220. By way of channels 251 and 252 in the body sections 220 and 240, the port 182a is in communication with the bores 241 and 242; and by way of two other channels 253, 254 the port 236 is also in communication with said bores. At their outer ends, the slides 243 and 244 are connected respectively to levers 255 and 256 fulcrumed on studs 257 and 258 projecting from opposite ends of the body section 240 of the valve 180a. At their lower ends, the levers 255 and 256 are connected to the armatures 259 and 260 of the actuating solenoids 261 and 262, these parts being all enclosed in a hollow housing 263 suitably affixed to the valve section 220. Normally the solenoid armatures 259 and 260 occupy the positions in which they are shown in Fig. 17 with their distal ends engaging fixed stops indicated at 264 and 265.

In order that the slides 243 and 244 may be moved manually in the event that they should stick, I have provided plungers 266 and 267 which extend outwardly through bosses 268 and 269 on the end walls of the housing 263. As shown, manipulating heads 270 and 271 at the outer ends of the plungers 266 and 267 are protected in flexible caps 272 and 273 of rubber or the like engaged over the bosses 268 and 269.

A further innovation to be noted here is that fingers 275 and 276 are affixed to the cams 52 and 53 and arranged to actuate switches 277 and 278 located within the offset 49 of the housing 7 as shown in Fig. 15. The double throw switch generally designated 280 in Figs. 17 and 18 is to be considered as located at a point remote from the field installed valve operating mechanism 6, said switch having movable contacts 281 and 282 for respectively bridging pairs of fixed contacts 283, 284 and 285, 286. Electric current is supplied from a power line 287 of which the mains are designated 288 and 289. The switch 277 is interposed in a conductor 290, 291 which extends from one terminal of the coil of the solenoid 261 to the contact 283 of the double throw switch 280, the other terminal of said coil being connected by a conductor 292 to the power main 288, and the contact 284 of the switch 280 being connected by a conductor 293 to the power main 289. The switch 278 is interposed in a conductor 294, 295 which extends from one terminal of the coil of the solenoid 262 to the terminal 285 of the double throw switch 280, the other terminal of said solenoid coil being connected by a conductor 296 to the power main 288, and the terminal 286 of the switch connected by a conductor 297 to the power main 289.

*Operation of modified embodiment*

In Fig. 17, assume that the trunk line valve 2 is closed. To open the valve 2, the switch 280 is pressed for bridging of the contacts 285 and 286 as in Fig. 18. As a consequence, current will flow from the main 288 through the conductor 296, the coil of solenoid 262, conductor 294, the closed switch 278, conductor 295 and conductor 297 to the power main 289. By energization of the solenoid 262, the armature 269 thereof will be retracted, and through the lever 256, the slide 244 will be shifted to the position in which it is shown in Fig. 18. Pressurized gas supplied by way of the pipe 119 will then flow through the channel 201, port 182a, channel 251, bore 241 and channel 249 to the end 225 of the bore 221 to act upon the piston head 223 and shift the slide 222 rightward to the position shown in Fig. 18, the end 226 of the bore 221 being relieved by exhaust of gas by way of the channel 250, bore 242, channel 254, port 236, channel 235 and pipe 237. At the same time, the pressurized gas will flow through the port 182a, bore 221, port 232, channel 234, port 184a and channel 207, port 69, bore of slide valve 60, port 70 and channel 215 to the nozzle 87 of the turbine 28 to drive the latter in the direction for opening of the trunk line valve 2. Upon opening of the trunk line valve, the cams 52 and 53 will have turned to the positions of Fig. 19 with the slide 58 shifted to cut the supply of pressurized gas to the turbine, the switch 278 opened and the slide 57 of check valve 57 shifted to the right, and the switch 275 closed. By opening of the switch 278, the current supply to the solenoid 262 is interrupted and the slide 244 in valve 180a is returned to its normal position by its spring. With the trunk line valve now open, the mechanism remains dormant in the condition in which it is shown in Fig. 19.

Figure 20:
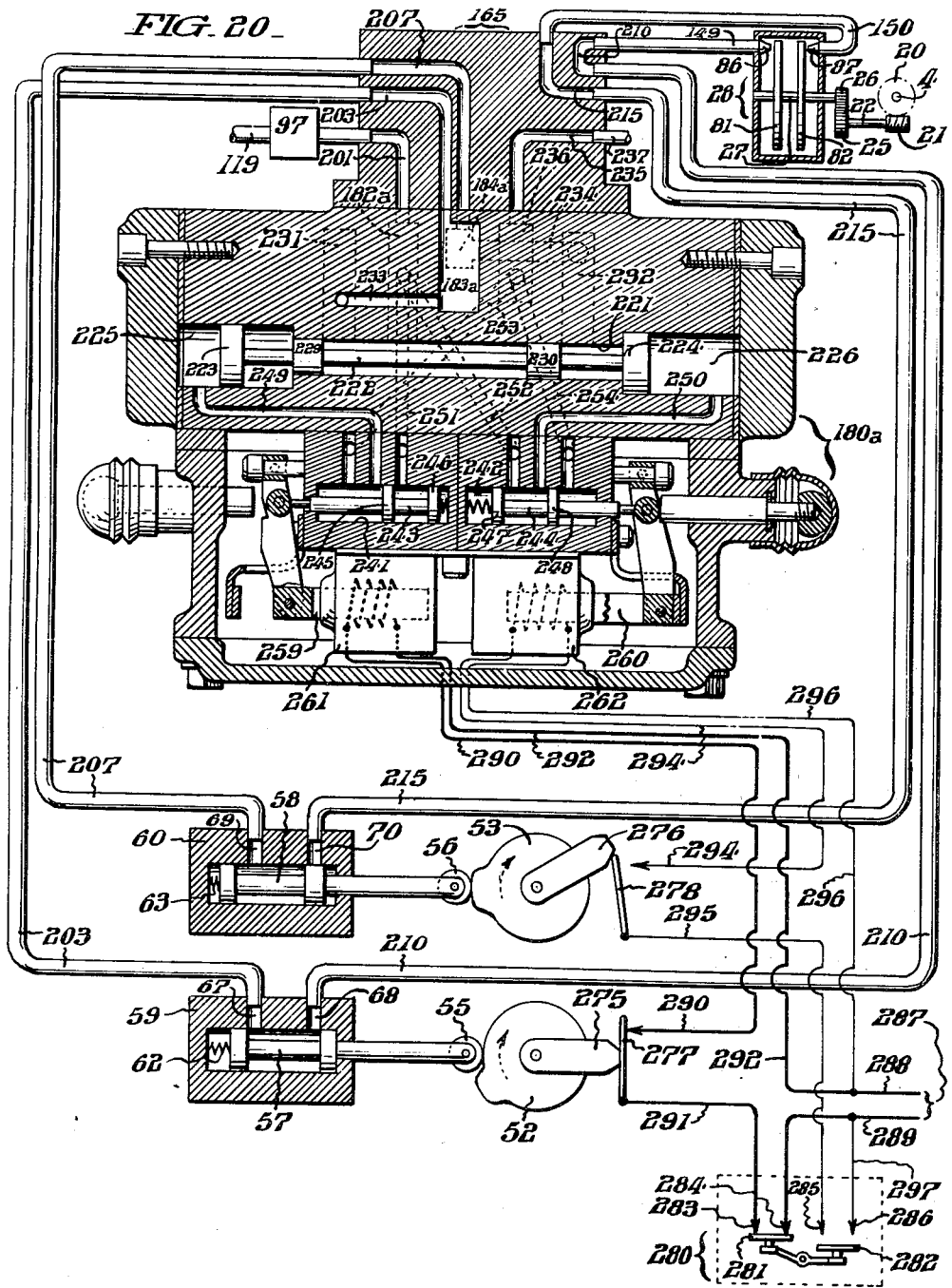

Closing of the trunk line valve 2 is initiated by actuation of the double throw switch 280 to bridge the contacts 283 and 284 as in Fig. 20. In this instance the solenoid 261 will be energized with attendant shifting of the slide 243 to the right in Fig. 17 whereby the left hand end 225 of the bore 221 will be brought into communication with the outside atmosphere by way of the passages 249, 241, 253, 236, 235 and the pipe 237 while, concurrently, pressurized gas is admitted from the inlet pipe 119 by way of the passages 201, 182a, 252, 242 and 250 to the right hand end 226 of the bore 221. As a result, the piston slide 222 is shifted leftward from the normal position of Fig. 17 to the position of Fig. 20, and pressurized gas allowed to flow by way of the passages 221, 231, 233, 183a, 203, port 67, bore and port 68 of the valve 59 (of which the slide 57 has been shifted to the extreme right at this time) and passage 210, 149 and nozzle 86 to drive the turbine 28 in the opposite direction as required for closing of the trunk line valve 2. Upon complete closing of the trunk line valve 2, the cams 51 and 52 will have returned to the positions in which they are shown in Fig. 17, with incidental closing of the switch 278, and with incidental opening of the switch 277 for de-energization of the solenoid 262 whereupon the slide 244 will be shifted rightward by its spring to interrupt further flow of pressurized gas to the nozzle 86 of the turbine 28.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. Mechanism for controlling a reversible turbine having a rotor with oppositely pitched vanes and separate nozzles respectively directed toward said vanes, said mechanism including channels leading respectively to the nozzles of the turbine; a selector valve having ports in communication respectively with the channels and an inlet port in communication with a source of pressure fluid; auxiliary valves of the slide plunger type interposed in the respective channels; and separate rotary cams having means connecting said cams to said turbine to cause rotation thereof in opposite directions to interrupt flow of pressure fluid to the nozzles by way of the respective channels after the turbine rotor has turned through a definite number of revolutions respectively in opposite directions.

2. The invention according to claim 1, further including a safety valve actuated from the turbine to cut off the flow of the pressure fluid to the selector valve in the event of overspeeding of the turbine in either direction.

3. Mechanism for controlling a reversible turbine having a rotor with oppositely pitched vanes and separate nozzles respectively directed toward said vanes, said mechanism including channels leading respectively to the nozzles of the turbine; a selector valve having a bore with ports in communication respectively with the channels and an inlet port in communication with a supply source of pressure fluid, a master piston slide within said bore operative upon being shifted in one direction to connect the outlet port of the selector valve for communication with one of the channels and upon being shifted in the other direction for communication with the other channel, secondary slide valves having pistons for individually controlling admission of pressure fluid from the supply source respectively to opposite ends of the master piston to shift the latter as aforesaid, solenoids for actuating the respective secondary piston slides; separate electric circuits in which the respective solenoids are interposed with a selective control switch; auxiliary valves respectively in the channels to the respective nozzles; and automatic means operated by said turbine for actuating said auxiliary valves to interrupt the flow of pressure fluid to the nozzles by way of the respective channels after the turbine rotor has turned through revolutions of definite numbers respectively in opposite directions.

4. Mechanism for controlling a reversible turbine having a rotor with oppositely pitched vanes and separate nozzles respectively directed toward said vanes, said mechanism including channels leading respectively to the nozzles of the turbine; a selector valve having a bore with ports in communication respectively with the channels, an inlet port in communication with a supply source of pressure fluid, a master piston slide within said bore operative upon being shifted in one direction to connect the outlet port of the selector valve for communication with one of the channels and upon being shifted in the other direction for communication with the other channel, secondary valves having pistons for individually controlling admission of pressure fluid from the supply source respectively to opposite ends of the master piston to shift the latter as aforesaid; solenoids for actuating the respective secondary piston slides; separate electric circuits in which the respective solenoids are interposed with a selective control switch; auxiliary valves of the plunger type respectively in the channels to the nozzles; and separate rotary cams actuated by the turbine to shift the plungers of the respective auxiliary valves and thereby interrupt flow of the pressure fluid to the respective nozzles after the turbine rotor has turned through a definite number of revolutions in opposite directions.

5. Mechanism for controlling a reversible turbine having a rotor with oppositely pitched vanes and separate nozzles respectively directed toward said vanes, said mechanism including channels leading respectively to the nozzles of the turbine; a selector valve having a bore with ports in communication respectively with the channels, an inlet port in communication with a supply source of pressure fluid, a master piston slide within said bore operative upon being shifted in one direction to connect the outlet port of the selector valve for communication with one of the channels and upon being shifted in the other direction for communication with the other channel; secondary valves having slide pistons for individually controlling admission of pressure fluid from the supply source respectively to opposite ends of the piston of the master valve to shift the latter as aforesaid; solenoids for actuating the respective secondary piston slides; separate electric circuits in which the respective solenoids are interposed with a selective control switch; auxiliary valves of the plunger type respectively in the channels to the nozzles; separate rotary cams actuated by the turbine, one cam to shift the plunger of one auxiliary valve for interruption of pressure fluid to one nozzle and the other cam to shift the plunger of the other auxiliary valve in readiness for flow of pressure fluid to the other nozzle when the selector valve is actuated for drive of the turbine in the opposite direction.

6. Mechanism for controlling a reversible turbine having a rotor with oppositely pitched vanes and separate nozzles respectively directed toward said vanes, said mechanism including channels leading respectively to the nozzles of the turbine; a selector valve having a bore with ports in communication respectively with the channels, an inlet port in communication with a supply source of pressure fluid, a master piston slide within said bore operative upon being shifted in one direction to connect the outlet port of the selector valve for communication with one of the channels and upon being shifted in the other direction for communication with the other channel; secondary valves having pistons for individually controlling admission of pressure fluid from the supply source respectively to opposite ends of the master piston to shift the latter as aforesaid; solenoids for actuating the respective secondary piston slides; separate electric circuits in which the respective solenoids are interposed with a selective control switch; auxiliary valves of the plunger type respectively in the channels to the nozzles; separate rotary cams actuated by the turbine, one cam to shift the plunger of one auxiliary valve for interruption of pressure fluid flow to one nozzle after the turbine has turned through a definite number of revolutions in one direction and the other cam to shift the plunger of the other auxiliary valve in readiness for flow of pressure fluid to the other nozzle when the selector valve is actuated for drive of the turbine in the opposite direction, and vice versa; and auxiliary switches in the respective circuits actuated by the respective cams, one such switch being opened upon actuation of the one auxiliary valve when the pressure fluid flow to the corresponding turbine nozzle is interrupted, and the other such auxiliary switch is closed for setting of the corresponding auxiliary valve in readiness for flow of pressure fluid to the other nozzle when the selector valve is actuated for drive of the turbine in the opposite direction upon opposite movement of the double throw switch.

7. Mechanism for controlling a reversible turbine having a rotor with oppositely pitched vanes and separate nozzles respectively directed toward said vanes, said mechanism including channels leading respectively to the nozzles of the turbine; a selector valve having a ported member adapted upon being moved to one position to connect one of the channels to a supply source of pressure fluid, and upon being moved to another position, to connect the other channel to the supply source of pressure fluid; auxiliary valves interposed in said channels to the respective nozzles; and rotary cams operated by the turbine, one cam to close one of the auxiliary valves for interruption of pressure fluid flow to the corresponding nozzle after the turbine has turned through a definite number of revolutions in one direction and the other cam to open the other auxiliary valve in readiness for flow of pressure fluid to the other nozzle when the selector valve is actuated for drive of the turbine in the other direction, and vice versa.

8. Mechanism for controlling a reversible turbine having a rotor with oppositely pitched vanes and separate nozzles respectively directed toward said vanes, said mechanism including channels leading respectively to the nozzles of the turbine; a selector valve having a ported member adapted, upon being moved to one position, to connect one of the channels to a supply source of pressure fluid, and upon being moved to another position, to connect the other channel to the supply source of pressure fluid; auxiliary valves with slidable pistons interposed respectively in said channels; and rotary cams operated by the turbine to shift the piston of one auxiliary valve to closed position for interruption of pressure fluid flow to the corresponding nozzle after the turbine rotor has turned through a definite number of revolutions in one direction, and concurrently cause the piston of the other auxiliary valve to be moved to open position in readiness for flow of pressure fluid to the other nozzle when the selector valve is actuated for drive of the turbine in the opposite direction, and vice versa.

References Cited in the file of this patent

UNITED STATES PATENTS

| | | |
|---|---|---|
| 818,499 | Wilkinson | Apr. 24, 1906 |
| 894,105 | Beale | July 21, 1908 |
| 981,271 | Hutchins | Jan. 10, 1911 |
| 993,384 | Ledoux | May 30, 1911 |
| 1,886,518 | Beckwith | Nov. 8, 1932 |
| 1,961,813 | Caughey | June 5, 1934 |
| 2,075,812 | Kerr | Apr. 6, 1937 |
| 2,152,651 | Kinzie | Apr. 4, 1939 |
| 2,444,391 | Whitfield | June 29, 1948 |
| 2,616,449 | Maha | Nov. 4, 1952 |
| 2,658,484 | Kenney | Nov. 10, 1953 |
| 2,700,986 | Gunn | Feb. 1, 1955 |
| 2,725,077 | Nicholl | Nov. 29, 1955 |